United States Patent
Galestien

[11] Patent Number: 6,047,479
[45] Date of Patent: Apr. 11, 2000

[54] METHOD AND DEVICE FOR ACCURATELY MEASURING A LONGITUDINAL CONTOUR OF A MEASURING OBJECT, SUCH AS A SCREW THREAD AND SIMILAR GEOMETRIES

[76] Inventor: Reginald Galestien, Veldkampen 2, 7861 BP Oosterhesselen, Netherlands

[21] Appl. No.: 09/054,229

[22] Filed: Apr. 2, 1998

[30] Foreign Application Priority Data

Apr. 3, 1997 [NL] Netherlands ............................ 1005718

[51] Int. Cl.[7] ................................ G01B 3/36; G01B 3/40; G01B 3/48
[52] U.S. Cl. .................................. 33/553; 33/546; 33/551
[58] Field of Search ............................... 33/545, 546, 549, 33/551, 552, 553, 554, 555, 1 PT, 199 R, 199 B, 556, 558, 559, 561

[56] References Cited

U.S. PATENT DOCUMENTS

| | | | |
|---|---|---|---|
| 3,750,297 | 8/1973 | Linley | 33/545 |
| 5,097,602 | 3/1992 | Cross | 33/549 |
| 5,276,974 | 1/1994 | Chanoni | 33/546 |

FOREIGN PATENT DOCUMENTS 0602768  4/1978  U.S.S.R. ................................ 33/546

Primary Examiner—Andrew H. Hirshfeld
Assistant Examiner—Faye Francis
Attorney, Agent, or Firm—Kinney & Lange, P.A.

[57] ABSTRACT

Method and device for accurately measuring a longitudinal contour of a measuring object, wherein use is made of clamping members for retaining a measuring object to be measured; a scanning arm which is pivotable about an axis transverse to a longitudinal center line of the clamped measuring object and whose free end comprises one scanning needle, the scanning arm being mounted on a driving device which, in operation, can move the scanning arm in one linear direction of movement parallel to the longitudinal center line of the measuring object, and means being provided for detecting the angular displacement of the scanning arm and the position of the scanning arm in said one linear direction of movement; and a processor for processing information regarding the angular displacement and the position of the scanning arm, wherein a contour measurement is made in such a manner that the scanning needle moves along a contour flank in downward direction only, i.e. in the direction of the bottom of a profile groove.

11 Claims, 6 Drawing Sheets ively measuring a longitudinal contour of a measuring object, in particular suitable for measuring internal or external screw thread contours and similar profiles, wherein use is made of a measuring device comprising clamping members for retaining a measuring object to be measured; a scanning arm which is pivotable about an axis transverse to a longitudinal center line of the clamped measuring object and whose free end comprises at least one scanning needle, extending transverse to the scanning arm, for canning a surface of the measuring object, the scanning arm being mounted on a driving device which, in operation, can move the scanning arm in at least one linear direction of movement parallel to the longitudinal center line of the measuring object, and means being provided for detecting the angular displacement of the scanning arm and the position of the scanning arm in the at least one linear direction of movement; and a processor for processing information regarding the angular displacement and the position of the scanning arm.

A method of the above-described type is known from, for instance, European patent application 0097537, British patent applications 2114746 and 2052065, and German patent application 3023607. A similar manner, in which, however, the scanning arm does not pivot but rotates about its own longitudinal center line, is known from applicants European patent 0589500.

Known devices for using a method of the above-described type are, for instance, the Conturograph from the firm Carl Mahr, the Contracer from the firm Mitutoyo, and the Form Taleysurph from the firm Rank Taylor Hobson.

A drawback of the known technique is that when for instance a screw thread profile or a groove for an O-ring or the like is measured, the scanning needle of the scanning arm is drawn in one direction, parallel to the longitudinal center line of the measuring object, over the surface to be scanned, while the scanning needle may catch behind the flanks of the screw thread or the like. This problem particularly occurs in screw threads or other contours having steep flanks, such as for instance trapezoidal thread according to DIN standard 103, or grooves for, for instance, O-rings or screw thread having straight flanks. If the scanning needle catches behind a flank, this may cause damage to the measuring equipment and/or inaccurate measurements. In the past, it has been proposed to solve this problem by setting the scanner into vibration. However, this too has an adverse effect on the accuracy of the measurement, as well as on the lifetime of the measuring equipment.

It is an object of the invention to overcome the drawbacks outlined and in general to provide an improved, accurate and reliable method and device for measuring a longitudinal contour of a measuring object. To this end, according to the invention, a method of the above-described type is characterized in that a contour measurement is made in such a manner that during the performance of a pivotal movement of the scanning arm, which involves the scanning needle moving along a contour flank, the driving device drives the scanning arm in such a manner that the scanning needle moves along a contour flank in downward direction only, i.e. in the direction of the bottom of a profile groove.

SUMMARY OF THE INVENTION

According to the invention, a device for accurately measuring a longitudinal contour of a measuring object, in particular suitable for measuring internal or external screw thread contours and similar profiles, comprising clamping members for retaining a measuring object to be measured; a scanning arm which is pivotable about an axis transverse to a longitudinal center line of the clamped measuring object and whose free end comprises at least one scanning needle, extending transverse to the scanning arm, for scanning a surface of the measuring object, the scanning arm being mounted on a driving device which, in operation, can move the scanning arm in at least one linear direction of movement parallel to the longitudinal center line of the measuring object, and means being provided for detecting the angular displacement of the scanning arm in the at least one linear direction of movement; and a processor for processing information regarding the angular displacement and the position of the scanning arm, is characterized in that the driving device is arranged for in each case moving the scanning needle from a high profile part in a first direction over the surface of the measuring object in a first phase, and moving it over the surface of the measuring object in a direction opposite to the first direction in a second phase, in such a manner that the scanning needle only meets descending profile flanks; and that the processor is arranged for combining the information obtained in the first and second phases into information about a complete profile section.

BRIEF DESCRIPTION OF THE DRAWINGS

Hereinafter, the invention will be further described with reference to the accompanying drawing of a number of exemplary embodiments.

DETAILED DESCRIPTION OF THE PREFERRED EMBODIMENT

Figure 1:
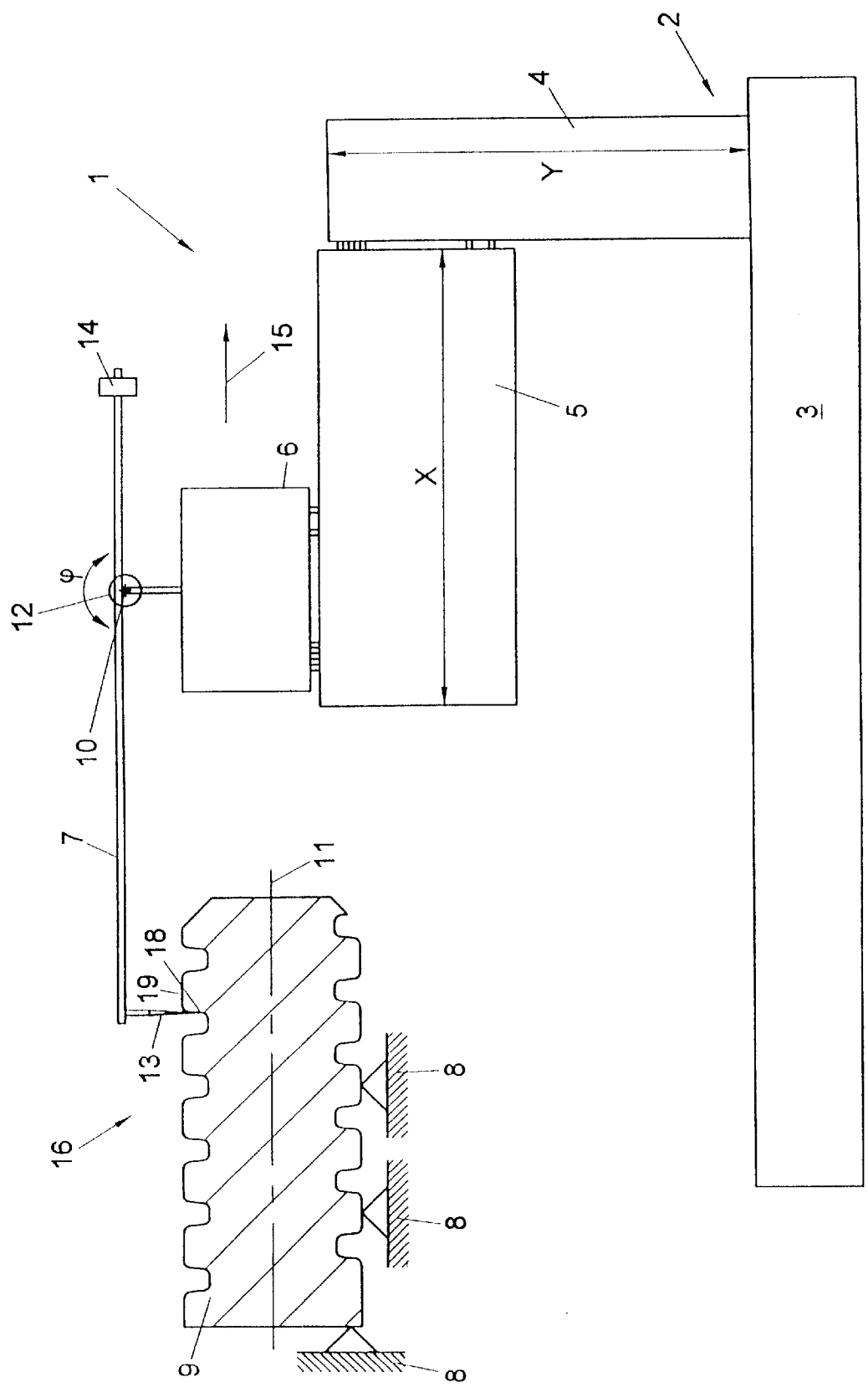
FIG. 1 and FIG. 2 diagrammatically illustrate a method and device according to the known technique.
Figure 2:
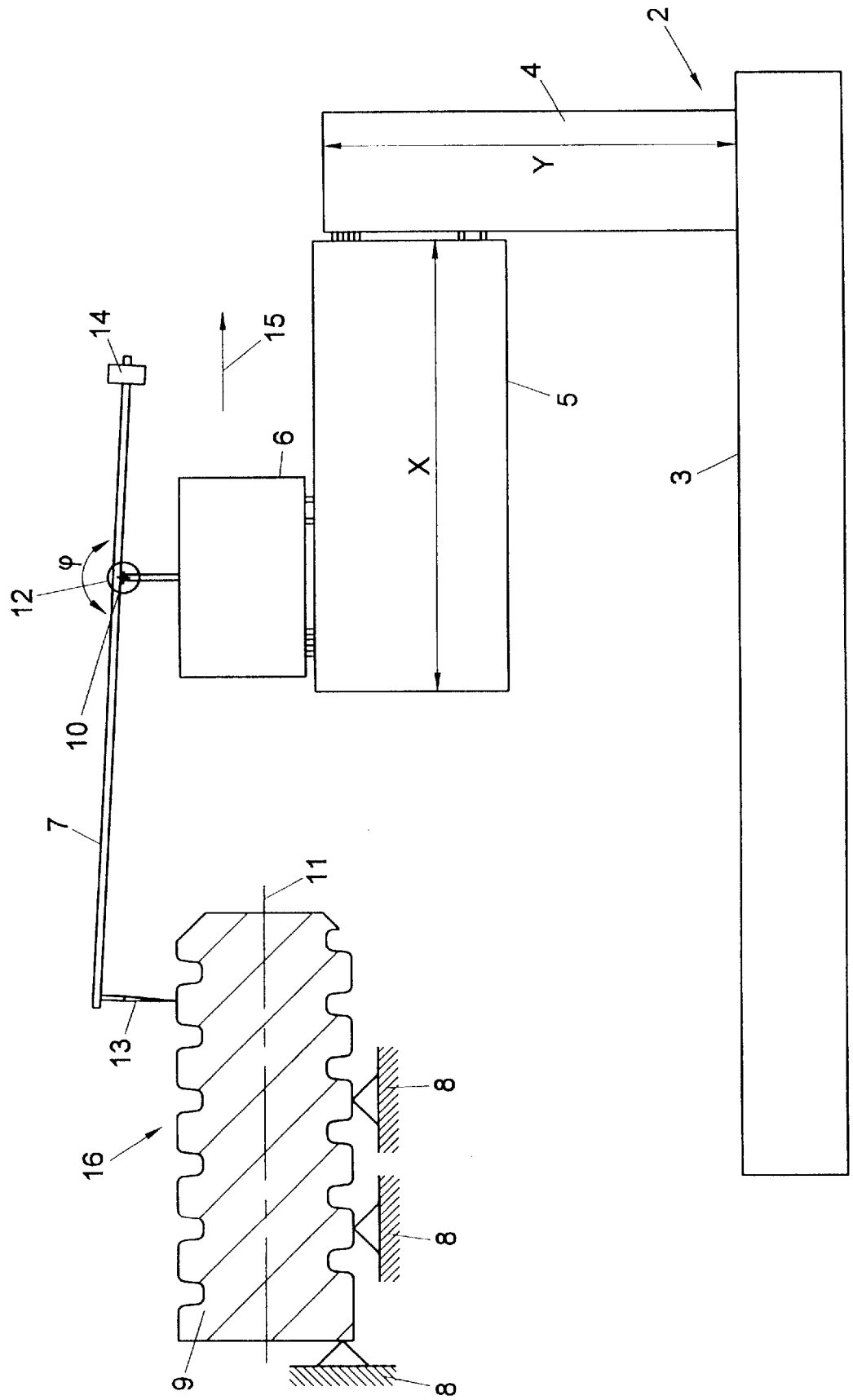

FIGS. 1 and 2 diagrammatically illustrate a known method and device for accurately measuring a longitudinal contour of a workpiece, for instance for scanning a screw thread profile or a group profile or the like.

The device 1 shown comprises a frame 2 having, in this example, a base 3 and a vertical part 4. A first carriage 5 can move along the vertical part 4 in vertical direction Y. Mounted on the carriage 5 is a second carriage 6, movable in horizontal direction X relative to the carriage 5. The second carriage 6 carries a scanning arm 7 extending in the direction of clamping members 8, which are indicated only diagrammatically and have a fixed position relative to the carriages 5 and 6. Preferably, the clamping members are mounted on the frame 2 as well.

In the situation shown, a measuring object 9 to be scanned is fixed in the clamping members B. At 10, the scanning arm 7 is mounted on the second carriage 6 so as to be pivotable in an axial plane extending through the center line 11 of the measuring object. For determining the Y-position of the first carriage and the X-position of the second carriage, sensors are present, not shown. Further, a detector 12 is present for detecting the angular displacement Q of the scanning arm.

At the end thereof extending in the direction of the clamping members, the scanning arm comprises a scanning element, in this example designed as a single scanning needle 13. At its other end, the scanning arm comprises a settable balance weight 14.

The force with which the scanning needle 13 can rest on the measuring object 9, which can for instance be a workpiece such as a lead screw, a bolt, a screw plug, or in general an object provided with internal or external screw thread or like profiles, is settable by means of the position and/or magnitude of the balance weight 14.

In accordance with the known technique, the first carriage 5 is moved to a suitable height Y, so that the scanning arm 7 is in an approximately horizontal position when resting by its scanning element 13 on the measuring object. Next, the scanning element 13 is moved over the surface of the measuring object, parallel to the center line 11 of the measuring object 9, in that the second carriage 6 is displaced over the first carriage 5 in the direction of the arrow 15, with the scanning element following the contour 16 of the measuring object. This involves the arm 7 pivoting up and down in the pivot point 10, depending on the momentary position of the scanning element on the contour. Because during the scan, the position of the second carriage 6 and the swivel position of the arm 7 are in each case accurately known, an accurate measurement of the shape of the object 9 can be performed in this manner.

In the example shown, the measuring object is provided with screw thread having steep flanks. In FIG. 1, the scanning needle lies precisely against the flank 18 of a screw thread back 19. If the carriage 6 now moves in the direction of the arrow 15, chances are that the scanning needle catches behind the screw thread back.

Another drawback is that scanning takes place with one scanning needle, so that only the contour on one side of the internal or external screw thread to be measured can be measured. Consequently, only the screw thread profiles that are scanned by the relevant scanning point one behind the other in axial direction can be analysed relative to each other. For cylindrical screw thread having straight flanks, the following parameters can then be determined with (disputable) accuracy from this one-sided, axial scan: pitch, angle of the front flank, angle of the rear flank, profile angle, profile height.

However, relative to the above-mentioned scanned screw thread profiles, the screw thread profiles located on the opposite side of the screw thread center line, on the intersection of the screw thread surface and the mathematical plane through the center line of the screw thread, are not scanned. Because of this, it is not possible to determine the outside diameter, core diameter and flank diameter in the case of cylindrical screw thread. Moreover, in the case of conical screw thread such as NPT and NPTF, it is not possible to determine the conicity and the flank diameter on the measuring face.

The method according to this invention does not have the above drawbacks and limitations, because of the following measures.

The scanning element always scans all full screw thread profiles in two cycles: a right (FIG. 3) and a left (FIG. 5) half-profile scan, each of the two profile flanks being scanned in the mechanically most favorable axial direction, i.e. the scanning needle moves over the screw thread flanks in that direction which best corresponds to the direction of the movement of the second carriage 6 and, accordingly, to the direction of the measuring force occurring.

In the case of external screw thread, the scanning needle moves along the profile flanks towards the screw thread center line; in the case of internal screw thread, the scanning needle moves along the profile flanks away from the screw thread center line.

Hence, during a measuring stroke, the scanning needle always moves from a screw thread back towards the bottom of a screw thread groove, and not in the opposite direction, as a result of which the scanning needle cannot be caught.

Figure 3:
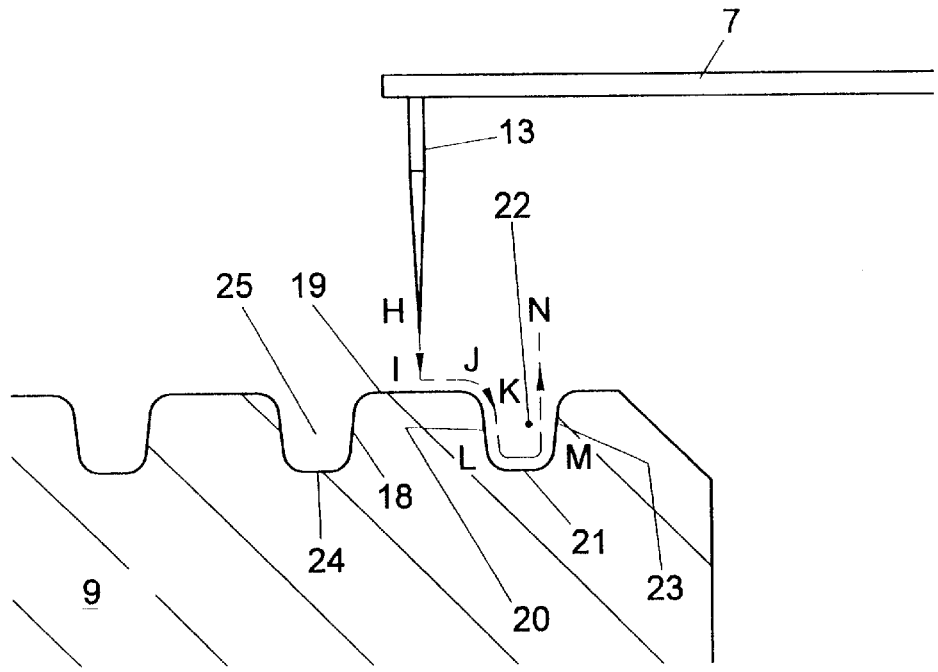
FIGS. 3 and 4 diagrammatically illustrate the basic concept of the invention.
Figure 4:
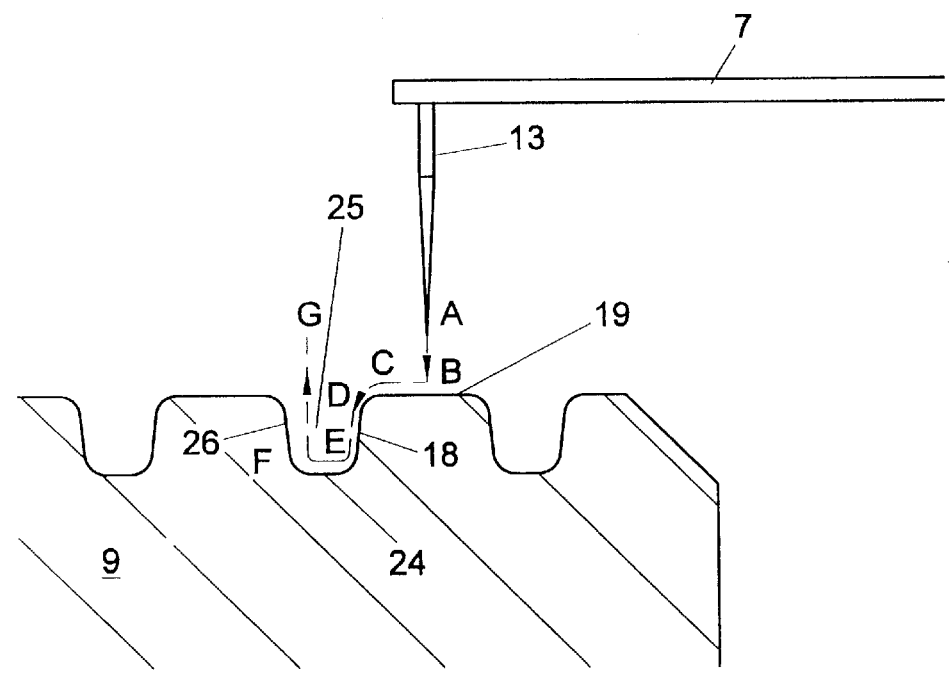

This prevents blocking and/or damaging of the scanning system according to the known method in the case of very steep screw thread flanks, such as those according to DIN 103. The same holds for other contours. A right half-profile scan is shown in FIG. 3. The scanning starts at position H above the back 19 and performs the scan via positions I through M. In position I, the tip of the scanning needle 13 rests on the back 19. Next, the carriage 6 and, accordingly, the arm 7 as well as the scanning needle 13 move rightwards until, at position J, the beginning of a descending flank 20 is reached. After a short portion which, in thin example, is not steep, a steep flank portion starts at position K. On this steep flank portion K–L, the scanning needle moves downwards, yet the needle is not pressed or pulled against the flank. After position L, the scanning needle moves over the bottom 21 of the screw thread groove 22 in the direction of position M adjacent the next, now ascending, steep flank 23. Precisely before the scanner will run against the steep flank, the scan is broken off and the scanner withdraws to position N. A left half-profile scan is shown in FIG. 4 where the scanner tip starts at position A above the back 19 and performs the scan via positions S through F.

In this second phase of the profile scan, the carriage 6 moves in the opposite direction compared with the movement in the first phase of the profile scan. In position B, the tip of the scanning needle rests on the screw thread back 19 again. Next, the needle moves leftwards (viewed in the Figure) until, at position C, the beginning of the flank 18 is reached. After a non-steep path C–D, a steep flank path D–E starts at D. Because the scan movement is performed leftwards (viewed in the Figure), the flank 18 is a descending flank again and the needle is again not pressed or pulled against the flank. After having followed a path E–F over the bottom 24 of the screw thread groove 25 and precisely before running against the steep flank 26, which would be an ascending flank if the carriage 6 moved in the same direction, the scanning needle is withdrawn to position G and the scan is broken off.

By always scanning, from a position on a screw thread back, the screw thread parts located on either side thereof in two phases with opposite directions of movement (see arrow 33 in FIG. 6) in the manner described, the scanning needle only meets descending flanks and the scanning needle is not pressed or pulled against the flanks.

Figure 5:
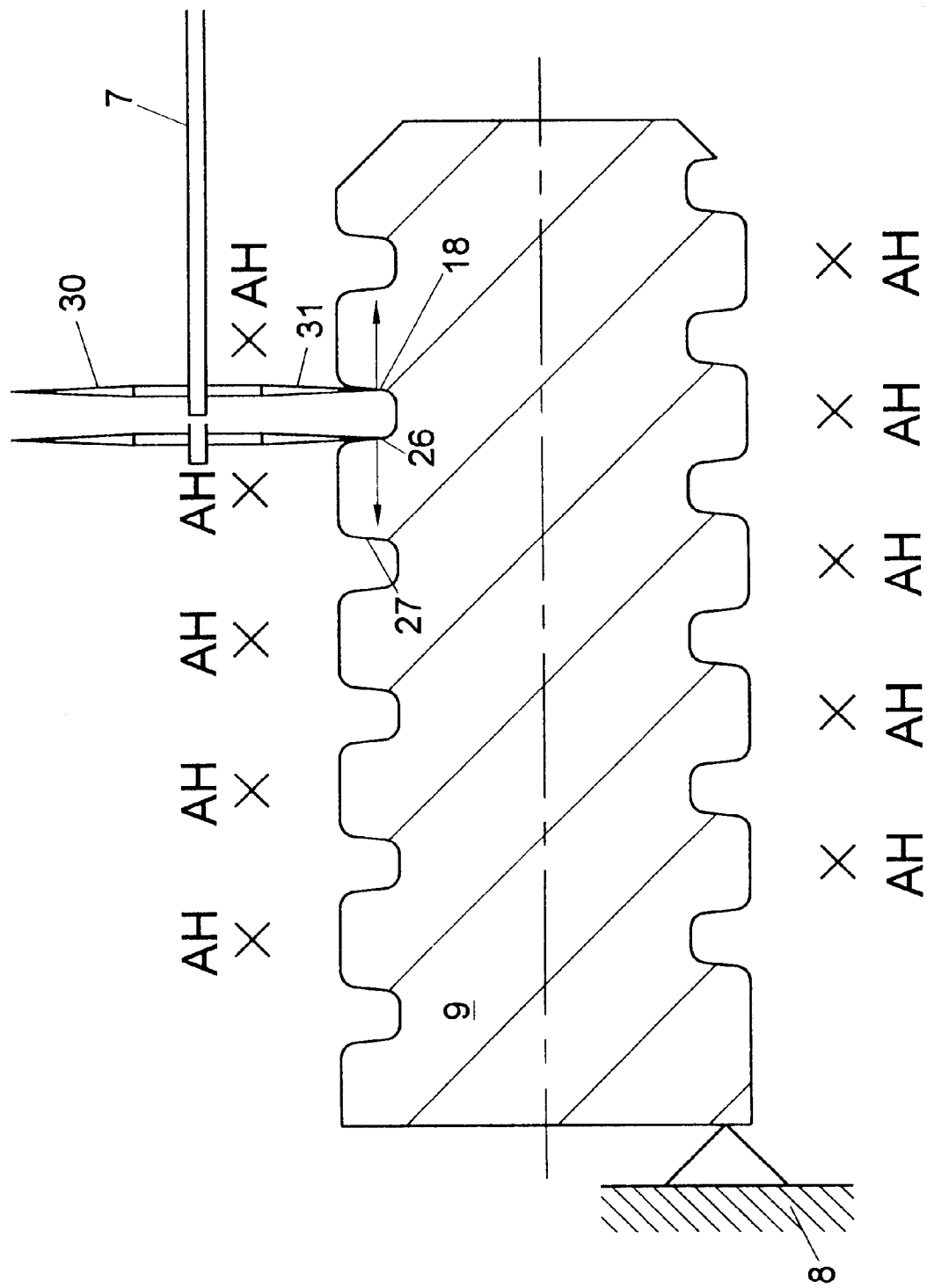
FIG. 5 diagrammatically shows the starting positions of the scanning phases of a contour scan according to the invention.

In FIG. 5, all necessary starting positions AH of the half-profile scans are indicated. All these starting positions can automatically be determined in machine coordinates on the basis of the scanning point being positioned, optionally under manual control, against the flanks 18 and 26. For this, the following should be separately known; the pitch, whether the thread is single-start or multiple-start, and which profiles are to be scanned. If the pitch is not given, it can be determined by the machine for calculating the AH starting positions by scanning another, third point on a next flank 27. By the mathematic combination of the half-profile scans, a complete one-sided contour of the screw thread to be measured can be determined with the center plane. To this end, a processor 28 (FIG. 6) is present, which receives signals X, Q. representing the position of the carriage 6 and the detector 12. This has the advantage over the known scanning method that in particular for screw thread having steep straight or round flanks, the pitch, angle of the front flank, angle of the rear flank, profile angle and profile height can be determined for each thread of the screw thread.

The novel method can moreover be extended to two-sided scanning.

Figure 6:
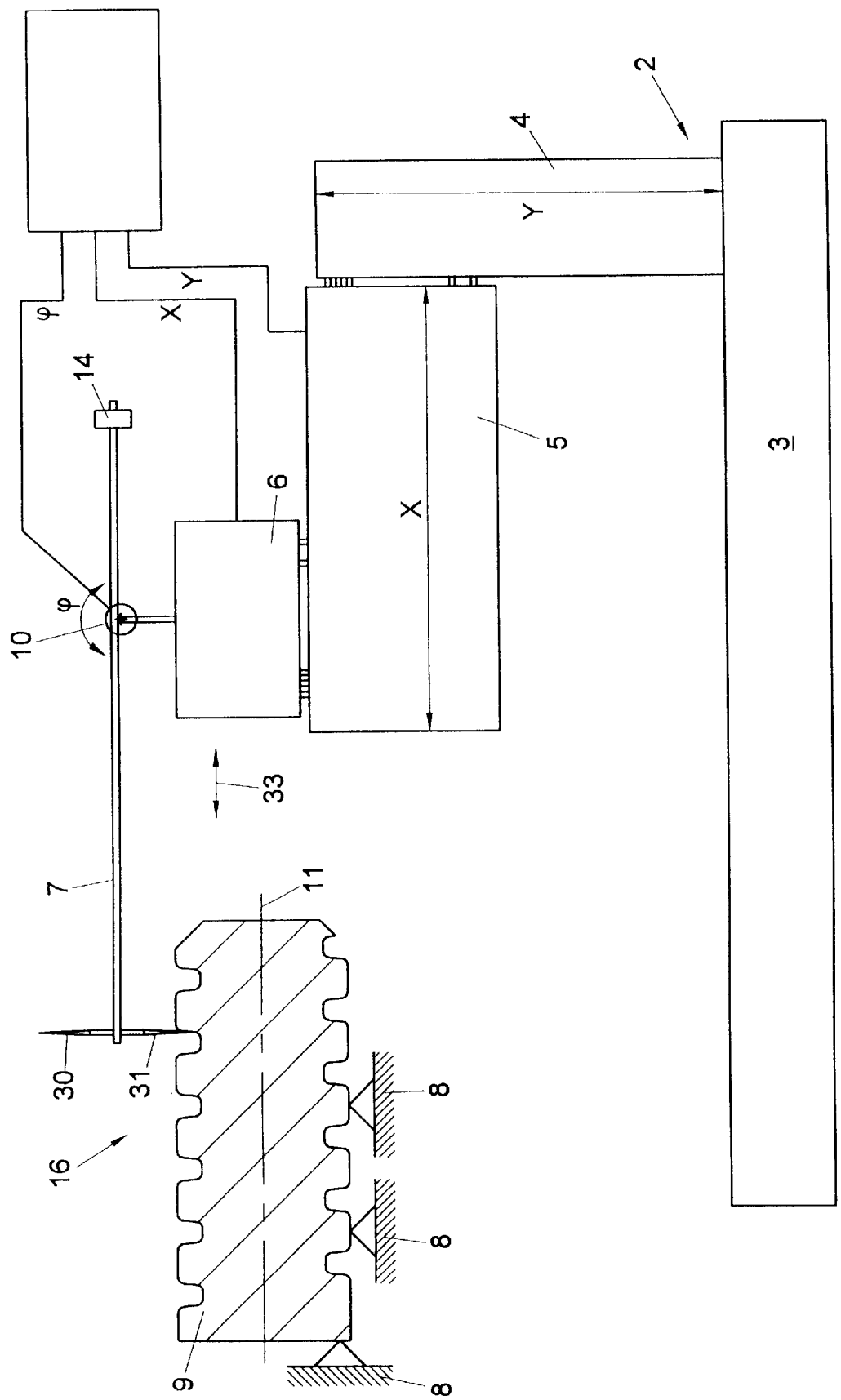
FIGS. 6 and 7 diagrammatically show a preferred exemplary embodiment of a device according to the invention.

A two-sided scan of the screw thread can for instance be performed by means of a double scanning needle 30,31, as shown in FIG. 5 and FIG. 6, in the plane coinciding with the center line of the screw thread: the center plane. By the mathematic combination of all half-profile scans, a complete section of the screw thread to be measured can be determined with the center plane. For this purpose, the processor 28 receives, apart from the above-mentioned signals, signals Y representing the position of the first carriage 5. This has the advantage over the known scanning method that in particular for screw thread having steep or round flanks, not only the pitch, angle of the front flank, angle of the rear flank, profile angle and profile height can be determined for each thread of the screw thread, but moreover also the outside diameter, core diameter and flank diameter, even in combination with a graphical presentation of the actual screw thread profile in the Minimum/Maximum material zone prescribed by the relevant standard. These parameters can also be determined for conical screw thread at any axial measuring position.

Figure 7:
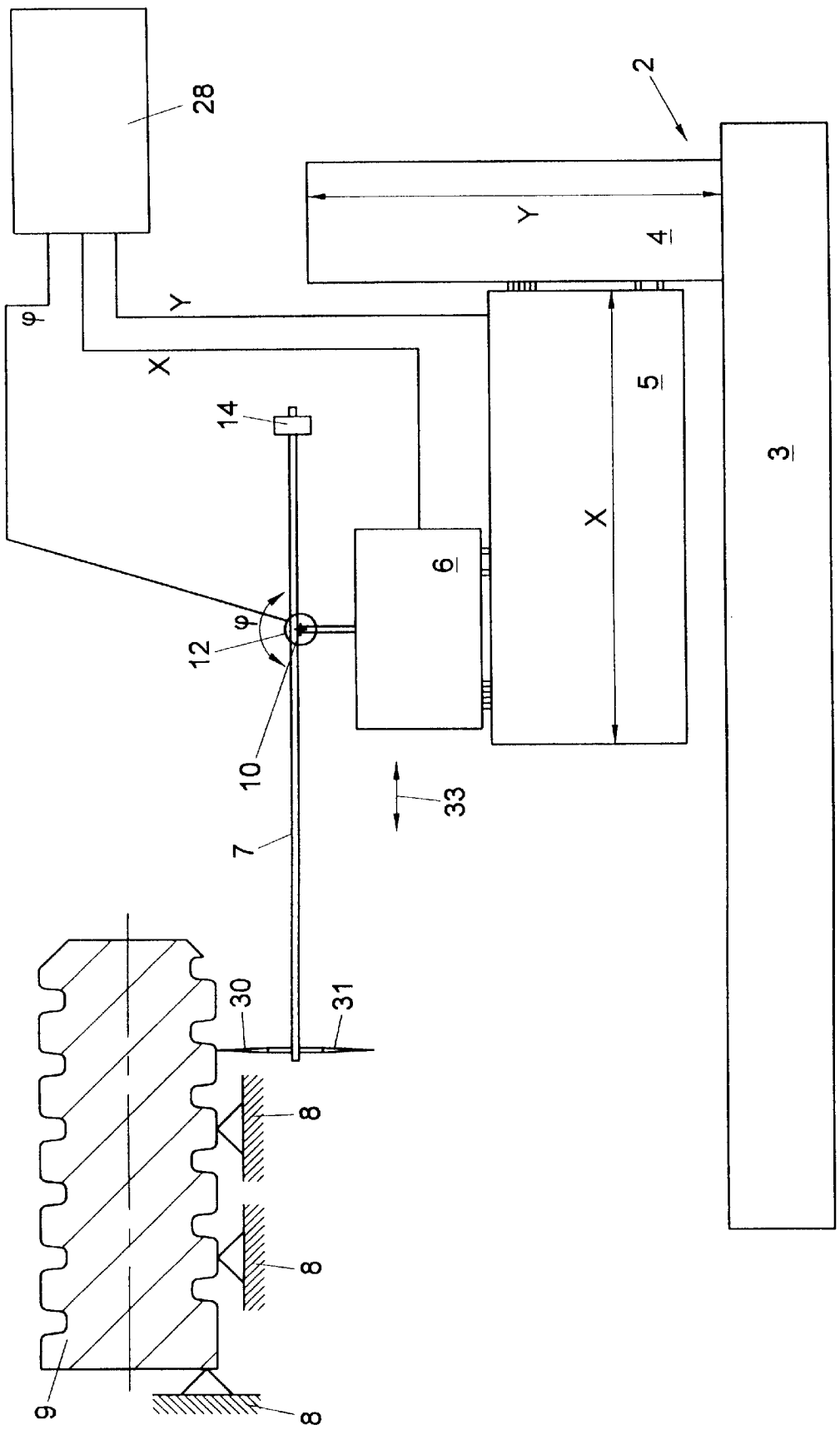

FIG. 6 diagrammatically shows the scan of the top contour of the measuring object 9 (viewed in a center plane) and FIG. 7 diagrammatically shows the scan of the bottom contour in the same center plane. For scanning the top contour 16, the lower scanning needle 31 is used, while for scanning the bottom contour, in respect of which the first carriage 5 has been moved to a lower position, an upper scanning needle 30 is used, which is preferably identical to the needle 31, yet oppositely arranged an the arm 7.

It is observed that after the foregoing, various modifications readily occur to anyone skilled in the art. For instance, it is possible to use one single scanning needle rather than two scanning needles if the scanning arm can be rotated about its own longitudinal center line for causing the scanning needle to point upwards or downwards (in FIG. 6 or 7).

Further, the influence of the dimensions of the tip of the scanning needle can of course be eliminated, for instance in the manner described in European patent 058950.

I claim:

1. A method for accurately measuring longitudinal internal or external contours of an object, the method comprising:
   providing a measuring device comprising:
   clamping members for retaining the object;
   a scanning arm which is pivotable about an axis transverse to a longitudinal center line of the object and having a free end;
   at least one scanning needle on the free end of the scanning arm, extending transverse to the scanning arm, for scanning a surface of the object;
   a driving device supporting the scanning arm which, in operation, can move the scanning arm in at least a first phase in one linear direction of movement parallel to the longitudinal center line of the object;
   means for detecting angular displacement of the scanning arm and position of the scanning arm in the linear direction of movement; and
   a processor for processing information regarding the angular displacement and the position of the scanning arm;
   clamping the object with the clamping members, the object having a contour with a plurality of descending contour flanks, a plurality of profile grooves and at least one ascending contour flank; and
   measuring the contour in such a manner that during movement of the scanning arm in the linear direction of the first phase, the scanning needle contacts only the descending contour flanks and the profile grooves, but does not contact the at least one ascending contour flank during the first phase, each of the descending contour flanks being measured in a downward direction of the scanning needle when the scanning arm is moved in the linear direction of the first phase.

2. A method according to claim 1, flier comprising:
   in a second phase, moving the scanning needle over the contour in a direction, opposing to said one direction; and
   breaking off the scan before each such that the ascending contour flank of the first phase becomes a descending contour flank of the second phase and the descending contour flanks of the first phase become ascending contour flanks of the second phase ascending contour flank in the second place is reached.

3. A method according to claim 2, characterized in that the scanning needle in a first phase is moved from a number of profile parts which are high in an axial plane.

4. A method according to claim 1, characterized in that the after object is first scanned along the contour in an axial plane, the object is subsequently scanned along a second contour, located opposite the first scanned contour in the axial plane, for determining an axial sectional contour.

5. A method according to claim 1 for measuring screw thread, characterized in that starting positions of scanning phases are determined by detecting positions of the contour flanks with the scanning needle and combining position information obtained with information about pitch of the screw thread wherein the contour flanks are successive.

6. A method according to claim 5, characterized in that the pitch is determined by detecting position of third successive contour flank.

7. A device for accurately measuring longitudinal internal or external contours of an object, comprising:
   clamping members for retaining the object;
   a scanning arm which is pivotable about an axis transverse to a longitudinal center line of the object and having a free end;
   at least one scanning needle on the free end of the scanning arm, extending transverse to the scanning arm, for scanning a surface of the object;
   a driving device supporting the scanning arm which, in operation, can move the scanning arm parallel to the longitudinal center line of the object;
   means for detecting angular displacement of the scanning arm; and
   a processor for processing information regarding the angular displacement and the position of the scanning arm;
   wherein the driving device is arranged for moving the scanning needle in a first phase from a high profile part over the surface of the object in a first direction and in a second phase over the surface of the object in a direction opposite to the first direction, in such a manner that the scanning needle during the first phase meets only a plurality of descending contour flanks the and does not contact at least one ascending contour flank, located between the descending contour flanks each of the descending contour flanks in the first phase being measured in a downward direction of the scanning needle when the scanning arm is moved in the direction of the phase; and wherein the processor is arranged for combining information obtained in the first and second phases into information about a complete profile section of the object.

8. A device according to claim 7, characterized in that the driving device is arranged for moving the scanning arm also in a second direction transverse to the directions of the first and second phases, for scanning opposite profile surfaces of the object; and in that the processor receives signals representing the position of the scanning arm in the second direction.

9. A device according to claim 7, characterized in that the scanning arm has additional scanning needle, extending adjacent the free end of the scanning arm transverse to the scanning arm.

10. A device according to claim 7, characterized in that the processor is arranged for determining, on the basis of information about pitch of a screw thread and position of two successive contour flanks of the plurality of descending contour flanks, starting positions for contact of the scanning needle to the object.

11. A device according to claim 10, characterized in that the processor is arranged for determining the pitch of the screw thread based on information about a third contour flank.

* * * * *

UNITED STATES PATENT AND TRADEMARK OFFICE
CERTIFICATE OF CORRECTION

PATENT NO. : 6,047,479
DATED : April 11, 2000
INVENTOR(S) : Reginald Galestien

It is certified that error appears in the above-identified patent and that said Letters Patent is hereby corrected as shown below:

<u>Column 6,</u>
Line 14, delete "flier", insert -- further --

Signed and Sealed this

Twenty-first Day of May, 2002

JAMES E. ROGAN
*Director of the United States Patent and Trademark Office*